Oct. 23, 1956 R. H. DITTMORE ET AL 2,768,105
METHOD OF SPLICING COAXIAL CABLES,
Filed June 28, 1954 3 Sheets-Sheet 1
FIG. 1
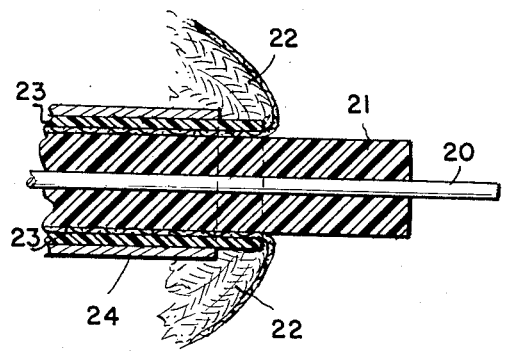
FIG. 2
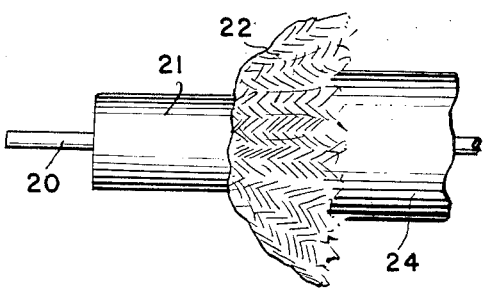
FIG. 3
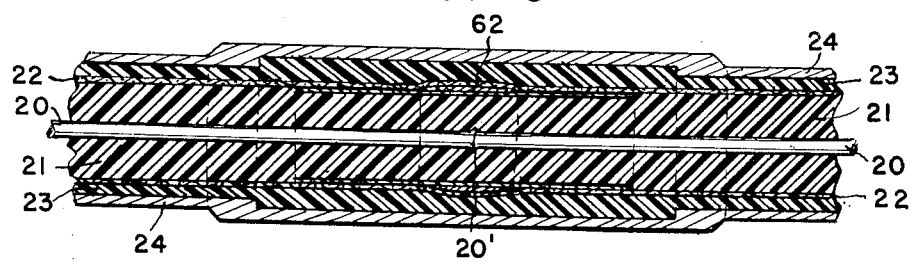
FIG. 4
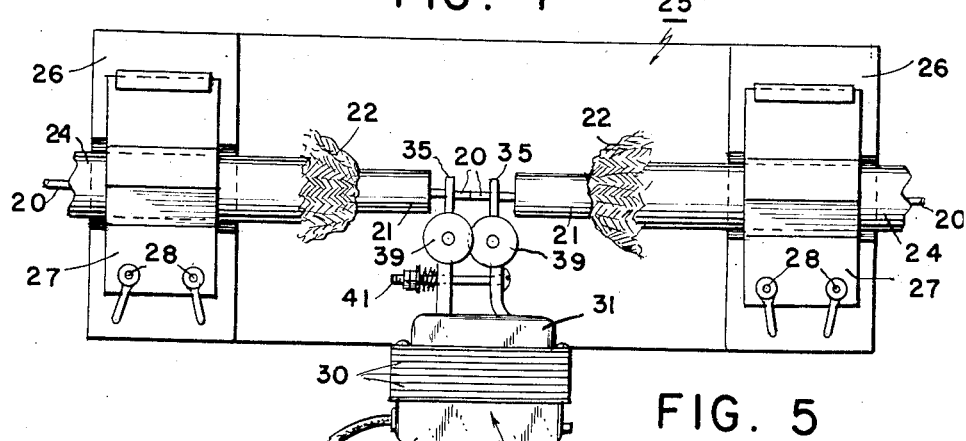
FIG. 6
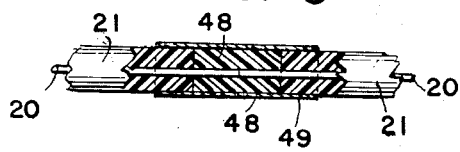
FIG. 5
INVENTORS
RAY H. DITTMORE
WALTHER RICHTER
DANIEL SHADD
JAMES A. McMILLAN
BY RUSSELL W. TRICKLE, Jr.
ATTORNEYS Oct. 23, 1956 R. H. DITTMORE ET AL 2,768,105
METHOD OF SPLICING COAXIAL CABLES
Filed June 28, 1954 3 Sheets-Sheet 2

INVENTORS
RAY H. DITTMORE
WALTHER RICHTER
DANIEL SHADD
JAMES A. McMILLAN
BY RUSSELL W. TRICKLE, Jr.
H.B. Willson Co, ATTORNEYS Oct. 23, 1956  R. H. DITTMORE ET AL  2,768,105
METHOD OF SPLICING COAXIAL CABLES
Filed June 28, 1954  3 Sheets-Sheet 3

INVENTORS
RAY H. DITTMORE
WALTHER RICHTER
DANIEL SHADD
JAMES A. McMILLAN
BY RUSSELL W. TRICKLE, Jr.
H.B. Willson & Co., ATTORNEYS

United States Patent Office 2,768,105
Patented Oct. 23, 1956

2,768,105

METHOD OF SPLICING COAXIAL CABLES

Ray H. Dittmore, Milwaukee, Walther Richter, Whitefish Bay, Daniel Shadd and James A. McMillan, Milwaukee, and Russell W. Trickle, Jr., Janesville, Wis., assignors to Dittmore-Freimuth Corp., Milwaukee, Wis., a corporation of Wisconsin Application June 28, 1954, Serial No. 439,752

13 Claims. (Cl. 154—2.22)

This invention relates to the splicing of coaxial conductor cables of the type in which a braided outer conductor is spaced from a central conductor by a thermoplastic dielectric material such as polyethylene and is surrounded by a thermoplastic protective sheath of polyvinyl or the like, the latter being in turn protected by at least a lead sheath. Cables of this character are designaed as Type RG 84/U Lead Cable, and when they have armor wires and impregnated jute over the lead sheath, they are designated Type RG 85/U Armored Cable.

In the splicing of a high frequency cable of this type the primary consideration is to make such a splice that there will be no attenuation of the signal at the splice or any reflected waves traveling back to the source, from the splice. There are various ways of accomplishing this, but the method of this application is to splice the center conductor, the dielectric and the outer conductor with materials as nearly as possible identical with the materials of the original cable, and to keep all dimensions and positions from the center of the cable through the inside diameter of the outer conductor as close as possible to the original. From the outside diameter of the outer conductor out to the exterior of the cable, the dimensions and materials used do not affect the cable electrically, but are important for physical protection, waterproofing, and tensile strength. Since such cables contain thermoplastics and since heat must be used in soldering operations to effectively bond the sections of the inner conductor and the sections of the outer conductor of the cable lengths to be spliced, it is important that these soldering operations, as well as the molding of the lead splice joining the lead sheaths or jackets of the cable ends, be carried out in manners that will not damage the thermoplastic material or change the concentricity of the two conductors. It has been discovered that by the use of the means and the procedures herein disclosed, splices in such coaxial cables may be made by unskilled persons with a great saving in time and materials over prior practices and with the practical certainty of producing splices that are far better than have been obtained in the past by skilled operators. Hence one object of the invention is to provide new and improved methods of splicing coaxial cables of the character above mentioned.

The new method contemplates several steps all of which are essential in order to obtain the above indicated results. One step is the soldering of the inner conductor sections by the application of heat to only the extreme end portions of these conductors while they are held in end to end contact, this being done by including the end portions in the circuit of a transformer. Such heating not only prevents melting of the dielectric on the cable ends but enables the overall length of the entire cable splice to be made unusually short, since when a soldering torch is used the dielectric must be stripped a considerable distance from the extremity of each of the inner conductors.

Another step resides in wrapping metal foil around the bared ends of the dielectric sheaths and small pieces or slugs of the same dielectric molded to fill the space between the dielectric sheaths, then clamping on the foil two halves of a mold having a minimum of metal over the dielectric portions to be bonded and applying heat to the metal by a thermostatically controlled electric heater to rapidly melt and expand the slug and the abutting ends of the sheaths, allowing pressure to be built up in the mold to fuse the softened material, preventing the escape of the dielectric and the sticking of the latter to the mold, and enabling the mold to be removed sooner without damaging the polyethylene dielectric. Such operation insures the dielectric splice having the same diameter as the dielectric sheaths of the cable ends and permits of the quick application of heat to only a small area of the dielectric material.

Another step resides in the joining of the outer braided conductor ends by a soldered joint which will retain a concentric juncture without damage to the underlying dielectric splice. This procedure involves wrapping copper foil around the exposed dielectric, drawing the braided outer conductors over the copper foil and holding them down by friction tape except at their extreme ends, wrapping rosin core wire solder over the exposed ends of the braid, wrapping aluminum foil over these parts, and applying heat and pressure to the aluminum foil by a thermostatically controlled electric heater, the aluminum foil confining the melted solder. The aluminum foil and tape are then removed leaving a concentric bond with a uniform internal diameter, with none of the wires of the braid extending into the dielectric and with no damage to the latter.

Another step involves the application over the bonded outer conductor of a precast or previously molded longitudinally split replacement sheath of the same thermoplastic material as the protective sheaths of the cable ends, the split sleeve or sheath filling the space between the ends of the lead sheaths, then wrapping a metal foil around the replacement plastic piece and the adjacent end portions of the lead sheaths, then clamping the two halves of a cylindrical mold over the foil, and applying heat to the mold by a thermostatically controlled electric heater, the foil serving to close the joints of the mold, to confine the pressure and prevent escape of the vinyl plastic, and to permit easy and quick removal of the mold without damage to either of the bonds of the thermoplastic materials.

The step of bonding a replacement sheath of lead over the vinyl bond and to the ends of the lead sheaths of the cable ends or lengths also involves the wrapping of a metal foil over the vinyl for protection from heat of the molten lead which is poured into a sectional lead mold clamped over the foil, the mold forming the equivalent of a wiped lead joint at each end of the replacement lead sheath.

With the above and other objects and advantages in view the invention resides in the novel method steps and combinations thereof, and the novel combinations and arrangements of parts hereinafter described and claimed, and illustrated in the accompanying drawings which show the present preferred practice.

In the drawings:

Figs. 1 and 2 are respectively a longitudinal section and a side elevation of the end of a length of lead covered coaxial cable with the sheaths cut back and braided conductor turned back so that the ends are ready for splicing;

Fig. 3 is a longitudinal section through the finished splice;

Fig. 4 is a diagrammatic view showing the cable lengths clamped in alinement on a stand or table with the jaws of a heating transformer applied to the inner conductor ends to be soldered together;

Fig. 5 is a perspective view of one of the precast dielectric slugs;

Fig. 6 is a detail section showing the slugs on the soldered inner conductor between the dielectric sheaths and wrapped with metal foil.

Figure 7:
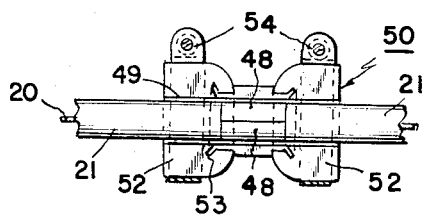
Fig. 7 is a longitudinal view partly in section showing a sectional mold clamped on the parts shown in Fig. 6.

Referring more particularly to Figs. 1, 2 and 3, which show a lead sheathed coaxial cable, the numeral 20 denotes the inner conductor, 21 the concentric polyethylene or similar dielectric, 22 the braided outer conductor over the thermoplastic dielectric, 23 the polyvinyl or other thermoplastic protecting sheath surrounding the outer conductor and 24 the lead sheath surrounding the vinyl. These views and most of the other views of the drawings are not to scale and some parts have been exaggerated for clearness. Figs. 1 and 2 show the ends of two cable lengths in each of which the dielectric has been stripped back a short distance on the inner conductor to a square end, the end of the braided conductor has been folded back to expose a small portion of the dielectric sheath, the protective vinyl sheath has been cut back to a square end adjacent the fold in the outer conductor and the lead sheath has been cut back to a square end to expose a small portion of the vinyl sheath so that the two lengths are ready to be united as in the completed splice shown in Fig. 3.

In the past the splicing of the center conductor has been done by silver soldering with a torch. That necessitated baring a long section of the conductor on each length to prevent melting or burning of the dielectric, but with our transformer method of silver soldering, the bared portions of the conductor ends are kept short since the heating is done very quickly and excess heat is conducted away by copper jaws which yieldably press the conductor ends together while supplying the heating current only to very short lengths of the conductors. By keeping the bared conductor ends short all subsequent molded sections of the thermoplastic sheaths are kept short and hence the splicing operations are easier to perform, and it minimizes the danger of the center conductor wandering and becoming eccentric with the outer conductor. Due to the stiffness of the cable lengths, it is necessary in making the several splices that they be rigidly held in axial alinement; and in Fig. 4 there is a diagrammatic showing of the cable lengths rigidly clamped in alinement on a work stand or table forming part of a portable splicing kit.

In Fig. 4, 25 represents a table having horizontally spaced raised portion 26 with alined transverse seats to receive the lead portions of the cable lengths. Clamp plates 27 with similar seats to receive the cables are detachably or hingedly held at one end and have clamping bolts 28 at their other ends to bind the cables in the opposed seats. Fig. 4 also shows diagrammatically the electric heating transformer 29, illustrated in Figs. 16–18, and positioned with its jaws clamped to the inner conductor ends and holding them in contact.

Figure 16:
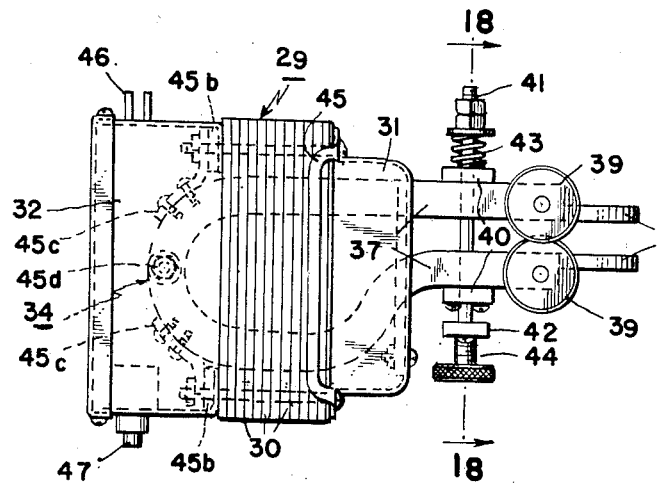
Fig. 16 is a top view of the electric heating transformer diagrammatically represented in Fig. 4.
Figure 17:
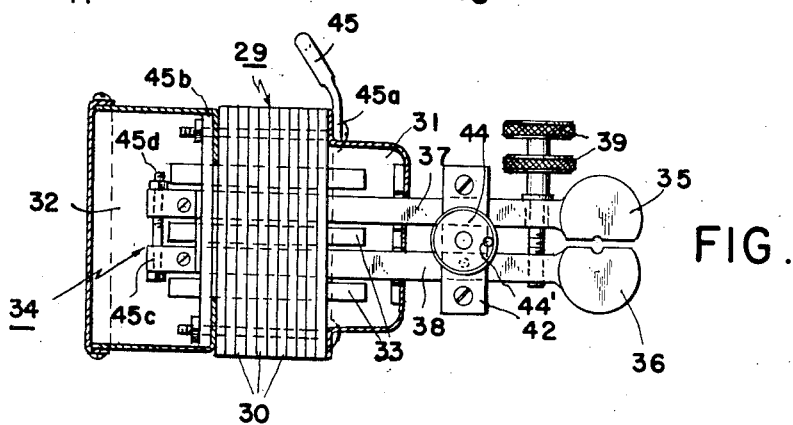
Fig. 17 is a side elevation with parts in section of the transformer.
Figure 18:
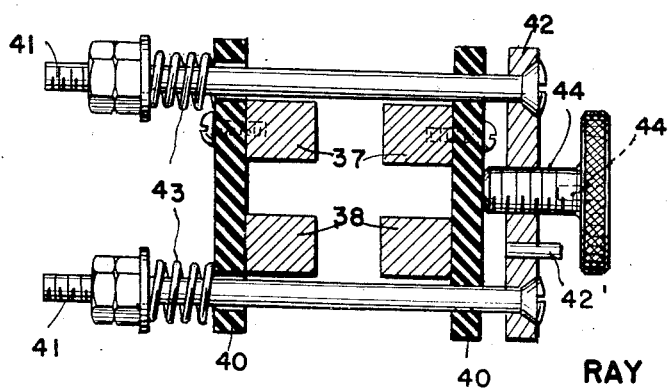
Fig. 18 is a detail section taken on line 18—18 in Fig. 16.

The transformer 29 comprises a body of laminations 30 with casing sections 31 and 32 fastened on opposite sides, these parts enclosing primary coils 33 and a secondary winding 34 consisting of two turns connected in parallel and made of heavy copper bars terminating in outwardly projecting pairs of parallel and slightly flexible arms which terminate in a pair of upper jaws 35 and a pair of opposed lower jaws 36, the two pairs of jaws being laterally spaced for clamping on the ends of the conductors 20. The upper jaws 35 are at the ends of arms 37 extending from one secondary turn, while the lower jaws 36 are at the ends of arms 38 extending from the other secondary turn, thus each pair of jaws constitutes one secondary turn but when clamped on the conductor, are effectively in parallel electrically. As seen in Fig. 16 the jaws are reduced in width to engage limited portions of the conductors, and the opposed jaws have notches or seats to receive the conductors as seen in Fig. 17. Each jaw is also formed with an enlarged mass of copper to absorb some of the heat generated in the conductor by the passage of the current. The jaws of each pair are moved toward each other to clamp the conductor end by a headed screw 39 rotatable in one arm 37 and screw threaded in the opposed arm 38. In order to maintain the conductor ends in contact during the heating operation the two pairs of jaws are yieldably urged toward each other by a spring tension means such as shown in Fig. 18. A pair of upright strips or plates of insulation 40 are fastened to the upper arms 37 and in their projecting ends are openings to slidably receive bolts 41. The heads of the latter are mounted in a metal plate 42 opposite one of the plates 40 and on their projecting threaded ends are nuts and washers with coil springs 43 between the washers and the adjacent plate 40. A headed adjusting screw 44 is threaded through the center of the plate 42 to thrust against the adjacent plate 40 to vary the tension of the springs. As seen in Fig. 18 coacting stop pins 44' and 42' on the head of screw 44 and the plate 42 may be used to limit the rotation of the adjusting screw. A handle 45 in the form of a loop may be fastened to the body of the transformer by bolts 45ª which fasten the front and rear casings to the laminations and also fasten phenolic plates 45ᵇ in the casing 32. To these plates are fastened brace straps 45ᶜ which hold the secondary turns or bars. The latter are connected together by a bolt connection 45ᵈ. A conductor cord clamp 46 is mounted on one side of the casing 32 and a push button switch 47 on the other side to control the current to the primary. This soldering transformer forms the subject matter of applicants' divisional application Serial No. 485,934 filed February 11, 1955.

After the prepared cable ends are clamped with the inner conductors in contact as shown in Fig. 4, the transformer is positioned and the pairs of jaws clamped to the conductor ends by turning down the screws 39. The conductor ends are then pressed tightly together and held under tension by adjusting the screw 44. Silver solder flux is applied to the conductor joint and switch 47 is operated to pass a high current through the contacting conductor ends between the jaws. As soon as the joint is hot enough silver solder wire is applied onto the joint 20'. In the event that slight points on the conductor ends should soften under heat, the ends will move closer together, preventing the circuit from being broken. Any bulge in the soldered joint is trimmed off by a file or emery paper.

The next step is splicing the dielectric sheaths and in the past that has been done by injecting melted polyethylene into a surrounding mold by means of a device similar to a grease gun. A torch was used to heat the device or gun and the temperature to which the polyethylene was heated was unreliable. If it was accidentally overheated much of the polyethylene flowed out of the relief holes before hardening occurred. In our method the space between the dielectric sheaths is filled with a piece or pieces of the same dielectric material, previously molded to the exact size and shape needed, then metal foil is wrapped around the precast slug and the exposed dielectric sheaths, and a mold and heater, as separate units, are used so that the mold which contains a very small amount of metal can be heated very rapidly by applying the heater and cooled very rapidly when the heater is removed. The foil keeps the melted dielectric in the mold and its expansion causes pressure to build up to insure a good bond where the material is joined. The foil also prevents sticking so that the foil may be stripped off without damage to the splice. By this method, the outside diameter of the dielectric is accurately maintained, and that is very important in high frequency coaxial cable.

Figure 8:
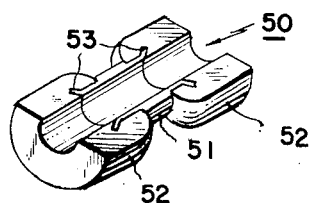
Fig. 8 is a perspective view of one of the half sections of the mold shown in Fig. 7.
Figure 9:
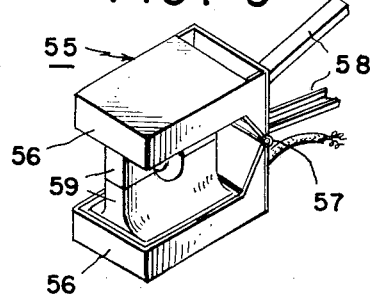
Fig. 9 is a perspective view of an electric heater which may be applied to the metal portions of the mold.

While the precast slug might be a longitudinally split one piece cylinder, two semi-cylindrical slugs such as shown at 48 in Fig. 5 are preferably used. When two of these slugs with grooves to receive the conductor are tightly fitted around the soldered conductor 20, a rectangular piece of copper or other metal foil 49 having a thickness of .002" is wrapped around the slugs and the adjacent ends of the dielectric sheaths 21, as shown in Fig. 6, this operation being of course performed while the cable lengths are clamped as shown in Fig. 4. The sectional mold to be applied to the foil is shown in Figs. 7 and 8. It consists of two similar half sections 50 each of which comprises a central metal body portion 51 and two enlarged end portions 52 of heat insulating material. The metal portion 51 is a semi-cylindrical sleeve of limited thickness so that when the half sections are applied the mold will have a minimum amount of metal to be heated. The insulator portions 52 are preferably molded on the metal portion by providing the latter with reduced and outwardly flared ends 53 which are embedded in the insulation. The three portions of each section form a semi-cylindrical bore to receive one half of the splice, and when the sections are applied they are clamped by split bands with threaded connectors such as the well known hose clamps shown at 54 in Fig. 7. These clamping bands engage semi-cylindrical outer surfaces of the heat insulators. The length of the metal portion of the mold is such that it is opposite the slugs and the abutting ends of the dielectric sheaths, as seen in Fig. 7, so that when an electric heater 55 such as shown in Fig. 9, is applied between the insulators 52, the heat will quickly melt those dielectric portions and produce a good joint or bond. The heater 55 comprises two sections 56 connected by a spring hinge 57 and provided with handles 58. An electric cord supplies current to resistance coils in opposed aluminum heating elements or blocks 59 on the hingedly connected sections 56. These heating elements are of a size to fit between the insulators 52 and have semi-cylindrical recesses so that when the heater is applied to the mold the elements will contact the exposed metal portions of the mold sections. The heater is thermostatically controlled and the heating elements are brought to a temperature of 890° F. before the heater is placed on the mold where it is left for 3½ minutes and then removed. After ten minutes the mold cools to about 200° F. and is removed, and the foil may then be easily stripped off of the polyethylene joint without sticking. The hose clamps cause the mold halves to tightly bind the foil on the dielectric sheaths, and its primary purpose is to seal the mold cracks to prevent any escape of the dielectric either between the mold sections or at the ends of the mold even though the unmelted portions of the dielectric sheaths may be pushed back slightly along the cable due to the expansion of the heated dielectric material of the slugs and the adjacent portions of the sheaths. The procedure requires only a small amount of the dielectric material to be melted and permits that to be quickly done and the splice to be quickly cooled. The bond may be improved by the application to the polyethylene dielectric portions to be united, of a solvent such as toluol immediately before applying the foil. The above described dielectric mold forms the subject matter of applicants' divisional application Serial No. 480,934 filed January 10, 1955.

Figure 10:
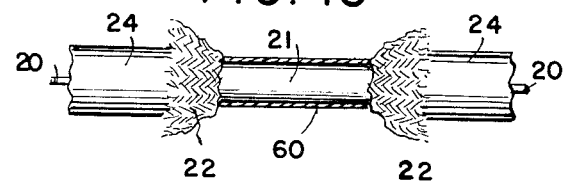
Fig. 10 shows a copper foil covering the bonded dielectric and on which the folded back braided conductors are to be soldered.
Figure 11:
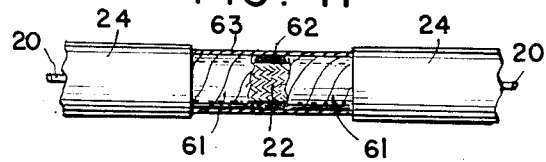
Fig. 11 shows the braided conductors taped down on the copper foil and their ends wrapped with wire solder, together with an aluminum foil over these parts and to which heat is applied to solder the outer conductor ends.

The next step of joining the braided conductors is also performed with the cable lengths in the clamps. In the past the turned back ends of the braid were laid down with a piece of copper foil either over or under the braid, and these parts were then soldered together with a soldering copper heated by a torch. In our method a piece of copper foil 60 of a thickness of .006" is wrapped around the dielectric splice as shown in Fig. 10. Then one of the folded back braided conductor ends is drawn over the copper foil and held thereon by a wrapping of friction tape 61 which extends from the vinyl sheath 23 to about a half an inch from the end of the braid. The same is done with the other folded back braid end. Then rosin core wire solder 62 is wrapped around the exposed extremities of the two braid ends, and around these parts is wrapped aluminum foil 63 having a thickness of .001", as shown in Fig. 11. To the aluminum foil is applied controlled heat and pressure to melt the solder which unites the wires of the braid ends to each other and to the copper foil making a good soldered joint having the same internal diameter as the braided outer conductor. The aluminum foil confines the solder and may be easily removed. After that is done the friction tapes 61 are removed and the finished joint may be wiped with a solvent and cloth to remove all traces of the friction tape and the rosin. The heat and pressure may be applied by the thermostatically controlled electric heater 55 shown in Fig. 9 by applying it at different positions for about four seconds along and around the foil, or a similar heater, with heating elements that will enclose substantially all of the aluminum foil, may be used.

Figure 12:
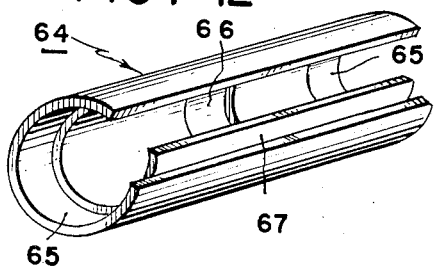
Fig. 12 is a perspective view of the split precast vinyl sleeve to fill the space between the ends of the lead sheaths of the two conductor lengths.
Figure 13:
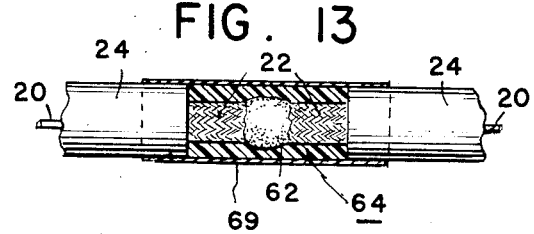
Fig. 13 is a sectional view showing the vinyl splicing sleeve applied to the soldered bond of the outer conductor and wrapped with metal foil.
Figure 15:
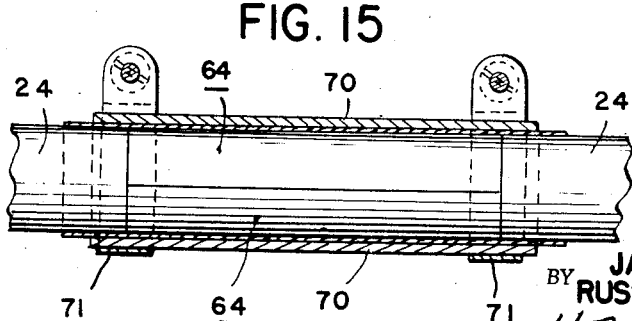
Fig. 15 shows the sectional mold fastened by end clamps over the parts shown in Fig. 13.
Figure 14:
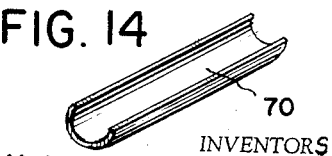
Fig. 14 is a perspective view of one of the half sections of the cylindrical mold to be applied to the parts shown in Fig. 13.

The next step is to replace the thermoplastic sheath, especially polyvinyl, on the cable being spliced. This is accomplished by inserting in the space between the ends of the lead sheaths 24 a precast longitudinally split cylindrical sleeve 64 of the same material as the protective sheaths 23. Such a replacement plastic splice or sleeve is shown in Fig. 12. It is molded to the size and shape of that space and when it is sprung around the soldered joint of the braided outer conductor, as shown in Fig. 13, it has the same external diameter as the lead sheaths 24. It is thicker at points between the ends of the vinyl sheaths and its end portions 65 are reduced to the thickness of the lead sheaths. On the interior of its center is an annular recess 66 to receive the lead portion of the braided conductor joint. One of the edges of the longitudinal slit is formed with a reduced flange 67 to be received in a longitudinal recess formed in the bottom of the opposite edge of the slit. When the vinylite jacket or sleeve has been fitted into said space, it is wrapped with a sheet of foil 69 of brass or other metal having a thickness of .002" the ends of the foil slightly overlapping the lead sheaths as shown in Fig. 13. Over this foil is clamped a sectional mold consisting of two semicylindrical sections 70, one of which is shown in Fig. 14. Hose clamps 71 or similar clamping bands are applied around the end portions of these mold sections as shown in Fig. 15 to tightly clamp them on the foil and the foil on the end portions of the lead sheaths. Prior to the application of the foil a solvent such as cyclohexanone is preferably applied to all vinyl surfaces that are to be united. Heat is then applied to the mold by a thermostatically controlled electric heater of the type shown in Fig. 9 but having larger heating element or blocks with semi-cylindrical recesses to fit the mold. When the heater has the proper temperature it is applied for four minutes, and after five minutes the mold and the foil may be removed. The foil not only prevents sticking but it seals the joints and the ends of the mold as the vinyl heats it melts and expands building up pressure in the mold and insuring a good bond. The metal walls of the mold are thin so that the vinyl is quickly melted, and the use of the separate heater permits its removal after the vinyl has melted and the quick cooling of the mold. Thus only limited portions of the vinyl sheaths are heated and a good waterproof sheath splice results.

When the coaxial cable lengths have lead sheaths, they are joined by a molded lead replacement sheath which surrounds the vinyl splice and has its ends bonded to the lead sheaths.

The joining of the lead sheaths of the two clamped conductor lengths also involves the use of a .002″ thick copper foil wrapped around the last described splice to protect the vinyl from burning when molten lead is poured into a mold to form a replacement lead sheath which unites the lead sheaths on the cable lengths being spliced. The copper foil covers the vinyl splice and on it is clamped two half sections of an aluminum mold, the ends of which overlap the ends of the lead sheaths so that when the lead is poured it not only forms a replacement lead sheath over the vinyl but the equivalent of wiped lead joints with the ends of the lead sheaths of the cable ends, as will be understood on reference to the sectional view Fig. 3 of the finished splice. For the sake of clearness the copper foil 60 is shown as embedded in the dielectric in Fig. 3 but in practice the internal diameter of the foil will be the same as the internal diameter of the braided conductor ends.

While the invention applies to almost all coaxial cables, it has been shown and described in connection with the extensively used cable having an exterior protective sheath of lead. When the coaxial cable does not have a lead sheath, the ends of the semicylindrical mold sections may be slightly reduced to tightly engage the exterior coverings of the cable ends when the clamping bands are tightened. When used in connection with an armored cable, it will be obvious that the armor wires will be temporarily bent back beyond the points where the lead or other protective sheaths are removed, and that the impregnated jute inner and outer layers, which envelop the armor wire, will be removed. After the splicing above described the armor wires are returned to their original positions and suitably fastened and impregnated jute layers are replaced.

From the foregoing, taken in connection with the accompanying drawing, it will be seen that novel and advantageous provision has been made for carrying out the objects of the invention, and while preferences have been disclosed, attention is invited to the possibility of making variations within the scope of the invention as claimed.

What is claimed is:

1. The method of splicing two lengths of coaxial cable each having an inner conductor and an outer surrounding braided conductor separated by a thermoplastic dielectric sheath, a thermoplastic protective sheath surrounding the outer conductor and at least a lead sheath surrounding the protective sheath, which comprises stripping back the sheaths to bare limited portions of the two conductors of each length, fixing end portions of the two lengths in axial alinement with the ends of the inner conductors in contact, heating the end portions of the bared inner conductors by passing an electric current through such portions while maintaining the ends of the same in contact, applying solder to the heated ends, applying precast slug of the same dielectric as that of the conductor sheaths around the joined inner conductor to fill the space between the dielectric sheaths of the two lengths, wrapping metal foil around the slug and the bared ends of the dielectric sheaths, applying over the foil a sectional mold, applying controlled heat to the portions of the mold opposite the slug to fuse them with the ends of the dielectric sheaths, removing the mold and foil, applying over the exposed dielectric material a copper foil covering, drawing the exposed portions of the braided outer conductors toward each other and into contact with the copper foil, wrapping rosin core wire solder around the extremities of the braided outer conductors, wrapping aluminum foil around the wire solder and the exposed portions of the braided conductors, applying heat and pressure to the aluminum foil to melt the solder and unite the braided conductors to each other and to the copper foil, removing the aluminum foil, applying a precast longitudinally-split replacement sleeve of the same thermoplastic material as the protective sheaths of the two cable lengths around the bonded braided conductor to fill the space between the ends of the lead sheaths, applying metal foil over the replacement plastic sleeve and the adjoining ends of the lead sheaths of the cable lengths, applying a sectional mold over the last mentioned metal foil, applying controlled heat to the last mentioned mold to fuse the replacement plastic sleeve to the protective sheaths of the cable lengths, removing the last mentioned mold and foil, and forming a lead replacement sheath over the replacement plastic with its ends bonded to the lead sheaths of the two lengths.

2. The method of claim 1 in which the electric heating current is supplied to the inner conductor sections by jaws clamped to such sections and included in the circuit of a transformer, the jaws being yieldably pressed toward each other to maintain the conductor ends in contact.

3. The method of claim 1 in which the sectional mold applied to the foil over the dielectric slug has a minimum of metal opposite said slug and in which the controlled heat applied to such mold is supplied by a thermostatically controlled electric heater placed on said metal portions of the mold.

4. The method of claim 1 in which the heat and pressure applied to the aluminum foil is supplied by a thermostatically controlled electric heater having spring pressed heating elements applied to the aluminum foil.

5. The method of claim 1 in which the controlled heat applied to the sectional mold around the metal foil over the replacement thermostatic sleeve is supplied by a thermostatically controlled electric heater having heating elements applied to the mold sections.

6. In a method of splicing two lengths of coaxial cable each having an inner conductor and an outer surrounding braided conductor separated by a thermoplastic dielectric sheath, a thermoplastic protective sheath surrounding the outer conductor, and an exterior protective sheath surrounding the thermoplastic protective sheath, the combination of the steps of stripping back the sheaths to bare limited portions of the two conductors of each length, fixing the end portions of two lengths in axial alinement with the ends of the inner conductors in contact, passing an electric current through only limited portions of the bared ends of the inner conductors to heat their contacting ends, and applying solder to such heated ends.

7. In a method of splicing two lengths of coaxial cable each having an inner conductor and an outer surrounding braided conductor separated by a thermoplastic dielectric sheath, a thermoplastic protective sheath surrounding the outer conductor, and an exterior protective sheath surrounding the thermoplastic protective sheath, the combination of the steps of stripping back the sheaths to bare limited portions of the two conductors of each length, fixing the end portions of two lengths in axial alinement, joining said inner conductors, applying precast slugs of the same dielectric as that of the conductor sheaths around the joined inner conductors to fill the space between the dielectric sheaths, wrapping metal foil around the slugs and the bared ends of the dielectric sheaths, applying over the foil a sectional mold, applying controlled heat to the portion of the mold opposite the slugs to fuse them with the ends of the dielectric sheaths, and removing the mold and foil.

8. In a method of splicing two lengths of coaxial cable each having an inner conductor and an outer surrounding braided conductor separated by a thermoplastic dielectric sheath, a thermoplastic protective sheath surrounding the outer conductor, and an exterior protective sheath surrounding the thermoplastic protective sheath, the combination of the steps of stripping back the sheaths to bare limited portions of the two conductors of each length, fixing the end portions of two lengths in axial alinement, joining said inner conductors, applying precast slugs of the same dielectric as that of the conductor sheaths around the joined inner conductors to fill the space between the dielectric sheaths, wrapping metal foil around the slugs and the bared ends of the dielectric sheaths, applying over the foil a sectional mold, applying controlled heat to the portion of the mold opposite the slugs to fuse them with the ends of the dielectric sheaths, removing the mold and foil, applying over the exposed dielectric material a copper foil covering, drawing the exposed portions of the braided outer conductors toward each other and into contact with the copper foil, wrapping rosin core wire solder around the extremities of the braided outer conductors, apply heat and pressure to the aluminum foil to melt the solder and unite the braided conductors to each other and the copper foil, and removing the aluminum foil.

9. In a method of splicing two lengths of coaxial cable each having an inner conductor and an outer surrounding braided conductor separated by a thermoplastic dielectric sheath, a thermoplastic protective sheath surrounding the outer conductor, and an exterior protective sheath surrounding the thermoplastic protective sheath, the combination of the steps of stripping back the sheaths to bare limited portions of the two conductors of each length, fixing the end portions of two lengths in axial alinement, joining said inner conductors, applying precast slugs of the same dielectric as that of the conductor sheaths around the joined inner conductors to fill the space between the dielectric sheaths, wrapping metal foil around the slugs and the bared ends of the dielectric sheaths, applying over the foil a sectional mold, applying controlled heat to the portion of the mold opposite the slugs to fuse them with the ends of the dielectric sheaths, removing the mold and foil, applying over the exposed dielectric material a copper foil covering, drawing the exposed portions of the braided outer conductors toward each other and into contact with the copper foil, wrapping rosin core wire solder around the extremities of the braided outer conductors, apply heat and pressure to the aluminum foil to melt the solder and unite the braided conductors to each other and the copper foil, removing the aluminum foil, applying a precast longitudinally split replacement sleeve of the same thermoplastic material as the protective sheaths of the two cable lengths around the braided conductor to fill the space between the ends of the exterior protective sheath, applying metal foil over the replacement plastic sleeve and the adjoining ends of the exterior protective sheaths of the cable lengths, applying a sectional mold over the last mentioned metal foil, applying controlled heat to the last mentioned mold to fuse the replacement plastic sleeve to the protective thermoplastic sheaths of the cable lengths, and removing the last mentioned mold and foil.

10. In a method of splicing the thermoplastic layers in electrical and electronic cable, the steps of clamping a mold having a small amount of metal around the plastic to be spliced and applying a separate electric heater, which was previously heated, to the metal portion of the mold to quickly heat the plastic, and then removing the heater allowing the mold to quickly cool, thereby preventing the conduction of heat through the cable in both directions and protecting the joined sections of the cable, and permitting the mold to be quite cool when removed.

11. In a method of splicing the thermoplastic layers in electrical and electronic cable, the step of wrapping the thermoplastic layer to be molded with metal foil before applying the mold thereon, the metal foil acting to seal the parting line of the mold and retain pressure within the mold, and also allowing the mold to be easily removed without sticking when quite cool, the metal foil being stripped from the thermoplastic layer when completely cold.

12. A method of splicing the plastic coverings of spliced conductors in electrical and electronic cables, comprising applying a precast replacement thermoplastic dielectric material over the exposed portions of the conductors to take the place of the plastic coverings which were removed to permit the splicing of the conductors, applying a metal foil over the replacement material and the adjacent portions of the plastic coverings, fastening over the metal foil a sectional metal mold having a length approximately that of the length of the plastic splice and a molding bore corresponding in diameter to that of the plastic coverings, the total metallic content of the mold being small to permit it to be quickly heated and to quickly cool, and applying heat to the metal portion of the mold until the replacement material melts and bonds with the conductor coverings and then discontinuing the application of heat, removing the mold when it has cooled, and removing the foil from the splice.

13. In a method of splicing the thermoplastic sheaths of electric and electronic cables, the inner conductors of which have been spliced, the steps of applying around the joined conductor a precast slug or slugs made of substantially the same plastic as the sheaths to be joined, the slug having the same diameter as the sheaths and filling the space between the opposed ends of the latter, wrapping a sheet of metal foil around the slug and the adjacent portions of the two sheaths, clamping the sections of a longitudinally divided mold about the foil whereby the latter will seal the parting line of the mold sections, and applying sufficient heat to the portion of the mold opposite the slug to fuse the latter to the abutting ends of the two sheaths.

References Cited in the file of this patent

UNITED STATES PATENTS

| | | |
|---|---|---|
| 713,844 | Boylan | Nov. 18, 1902 |
| 890,781 | Maiche | June 16, 1908 |
| 1,570,921 | Patterson | Jan. 26, 1926 |
| 1,932,391 | Apple | Oct. 31, 1933 |
| 2,019,064 | Apple | Oct. 29, 1935 |
| 2,444,075 | Violette | June 29, 1948 |
| 2,463,231 | Wyatt | Mar. 1, 1949 |
| 2,509,929 | Kleinfelder et al. | May 30, 1950 |
| 2,730,473 | Batezell et al. | Jan. 10, 1956 |